United States Patent [19]

Cooper, deceased et al.

[11] Patent Number: 4,576,991

[45] Date of Patent: Mar. 18, 1986

[54] UV-RESISTANT FLAME RETARDANT COMPOSITIONS OF POLYCARBONATES AND HALOGENATED ALKENYL AROMATIC COPOLYMERS

[75] Inventors: Glenn D. Cooper, deceased, late of Delmar, N.Y., by Rose Cooper, executrix; Sai-Pei Ting, Delmar, N.Y.

[73] Assignee: General Electric Company, Pittsfield, Mass.

[21] Appl. No.: 623,951

[22] Filed: Jun. 25, 1984

[51] Int. Cl.$^4$ ............................................. C08L 69/00
[52] U.S. Cl. ..................................... 525/146; 524/505; 524/508; 525/92; 525/147; 525/148; 525/468
[58] Field of Search ................... 525/146, 67, 92, 147, 525/148, 468; 524/504, 508

[56] References Cited

U.S. PATENT DOCUMENTS

| | | | |
|---|---|---|---|
| 3,880,783 | 4/1975 | Serini et al. | 525/67 |
| 3,890,266 | 6/1975 | Serini et al. | 524/611 |
| 3,896,185 | 7/1975 | Yonemitsu et al. | 525/67 |
| 3,978,158 | 8/1976 | Yonemitsu et al. | 525/146 |
| 4,172,103 | 10/1979 | Serini et al. | 525/165 |

Primary Examiner—Theodore E. Pertilla
Attorney, Agent, or Firm—Hedman, Gibson, Costigan & Hoare

[57] ABSTRACT

Flame retardant blends of an aromatic polycarbonate, preferably a tetraalkylsubstituted aromatic polycarbonate, and a copolymer of an alkenyl aromatic compound and a halogenated alkenyl aromatic compound are described. The ultraviolet light resistance and impact strength of articles molded from such compositions is superior to that of moldings prepared from corresponding blends of the polycarbonate, a polystyrene homopolymer and a conventional low molecular weight halogenated flame retardant agent.

11 Claims, No Drawings

UV-RESISTANT FLAME RETARDANT COMPOSITIONS OF POLYCARBONATES AND HALOGENATED ALKENYL AROMATIC COPOLYMERS

BACKGROUND OF THE INVENTION

Aromatic polycarbonates are well known, commercially available materials having a wide variety of applications in the plastics art. These polymers may be prepared by reacting a dihydric phenol, for example, 2,2-bis(4-hydroxyphenyl)propane, with a carbonate precursor, for example, phosgene, in the presence of an acid binding agent. In general, aromatic polycarbonates exhibit good resistance to attack by mineral acids, are readily moldable, and are physiologically inert.

Included among the known aromatic polycarbonates are tetraalkyl-substituted homopolycarbonates and copolycarbonates, as described in Serini et al., U.S. Pat. No. 4,172,103. As disclosed by Serini et al., the tetraalkyl-substituted polycarbonates are useful in compositions with homopolymers and copolymers of olefinically unsaturated monomers, such as polystyrene.

In generally, blends of aromatic polycarbonates and polystyrene are normally flammable. They are known to be rendered flame retardant, however, by the incorporation of bromine into the polycarbonate structure, for example, by the use of polycarbonate copolymers of tetrabromo bisphenol-A and tetramethyl bisphenol-A as disclosed in U.S. Pat. No. 3,890,266, or by the inclusion of conventional low molecular weight flame retardant additives such as decabromodiphenyl ether.

SUMMARY OF THE INVENTION

This invention comprises thermoplastic molding compositions of an aromatic polycarbonate, preferably a tetraalkyl-substituted bisphenol-A polycarbonate, and a copolymer of an alkenyl aromatic compound and a halogenated, preferably chlorinated or brominated, alkenyl aromatic compound, optionally rubber modified.

Surprisingly, it has now been discovered that blends of the aromatic polycarbonates, for example, tetramethyl bisphenol-A polycarbonate, with copolymers of an alkenyl aromatic compound and a halogenated alkenyl aromatic compound exhibit better UV stability than corresponding flame retardant blends of the polycarbonate with polystyrene homopolymer.

Moreover, it has been found that in blends of the present invention containing alkenyl aromatic copolymers having as much as 70% halogenated units, many mechanical properties such as tensile strength, ductility and impact strength are better than those of the corresponding blends of the polycarbonate with unhalogenated homopolystyrene. This is also surprising because it is known that alkenyl aromatic copolymers having about 35% or more halogenated units are not compatible with the polycarbonate, which in the normal case would lead one to expect poorer properties.

Thus, the compositions of this invention provide not only flame retardancy but, in comparison with polycarbonate-polystyrene blends made flame retardant with conventional halogenated additives, improvements in the UV stability, impact strength and other properties.

DETAILED DESCRIPTION OF THE INVENTION

In general, the aromatic polycarbonate resin, component (a), useful in the practice of this invention may be selected from among those having the formula

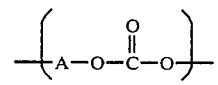

wherein A is a divalent aromatic radical of the dihydric phenol employed in the polymer producing reaction.

The polycarbonate is more typically a resin of the formula

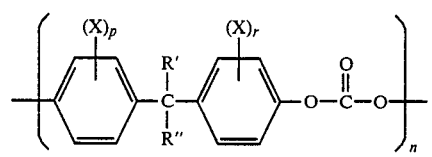

wherein R' and R" are, independently, hydrogen, (lower) alkyl or phenyl; X is, independently, (lower) alkyl, chloro, bromo or hydrogen; p and r are, independently, from 0 to 4; and n represents the total number of monomer units and is an integer at least about 30. The term "(lower) alkyl" is intended to mean a straight or branched alkyl group having from 1 to about 10, and more frequently, from 1 to about 6 carbon atoms, for example, methyl, ethyl, propyl, butyl, pentyl, hexyl, octyl, nonyl, decyl, isopropyl, isobutyl, trimethyl ethylmethyl, and so forth.

The tetraalkyl-substituted aromatic polycarbonate is preferably a polymer in which at least 50% of the linear chains comprise structural units of the formula

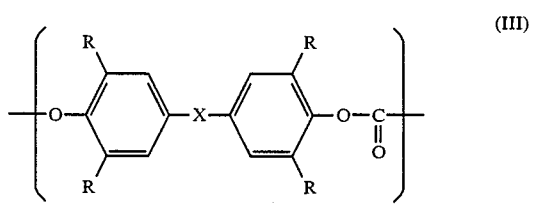

in which R represents $C_1$-$C_3$ alkyl and X represents a single bond, —O—, —CO—, —SO$_2$—, $C_1$-$C_{10}$ alkylene, $C_1$-$C_{10}$ alkylidene, $C_5$-$C_{15}$ cycloalkylene, $C_5$-$C_{15}$ cycloalkylidene, or

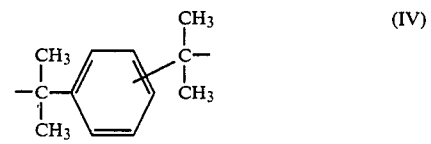

The polycarbonates containing structural units of Formula III, above, are known in the art and are prepared from 0,0,0',0'-tetraalkyl-substituted bisphenols and phosgene. If bisphenols that are not 0,0,0',0'-tetralkyl-substituted are also added, then so-called mixed polycarbonates are obtained in which only a portion of the structural units, in this case at least 50%, are 0,0,0',0'-tetraalkyl-substituted.

In accordance with this invention, mixtures of polycarbonates that contain structural units of Formula III and polycarbonates based on bisphenols which are not 0,0,0',0'-tetraalkyl-substituted may be used instead of these mixed polycarbonates, provided the total amount of the 0,0,0',0'-tetraalkyl-substituted structural units in the mixture is not less than 50%.

By way of illustration, the polycarbonates of Formula III may be derived from 0,0,0',0'-tetramethyl-substituted bisphenols such as:
bis-(3,5-dimethyl-4-hydroxyphenyl),
bis-(3,5-dimethyl-4-hydroxyphenyl)-ether,
bis-(3,5-dimethyl-4-hydroxyphenyl)-carbonyl acrylonitrile,
bis-(3,5-dimethyl-4-hydroxyphenyl)-sulphone,
bis-(3,5-dimethyl-4-hydroxyphenyl)-methane,
1,1-bis-(3,5-dimethyl-4-hydroxyphenyl)-ethane,
1,1-bis-(3,5-dimethyl-4-hydroxyphenyl)-propane,
2,2-bis-(3,5-dimethyl-4-hydroxyphenyl)-propane,
2,2-bis-(3,5-dimethyl-4-hydroxyphenyl)-butane,
2,4-bis-(3,5-dimethyl-4-hydroxyphenyl)-2-methyl butane,
2,4-bis-(3,5-dimethyl-4-hydroxyphenyl)-butane,
3,3-bis-(3,5-dimethyl-4-hydroxyphenyl)-pentane,
3,3-bis-(3,5-dimethyl-4-hydroxyphenyl)-hexane,
4,4-bis-(3,5-dimethyl-4-hydroxyphenyl)-heptane,
2,2-bis-(3,5-dimethyl-4-hydroxyphenyl)-octane,
2,2-bis(3,5-dimethyl-4-hydroxyphenyl)-nonane,
2,2-bis-(3,5-dimethyl-4-hydroxyphenyl)-decane,
1,1-(3,5-dimethyl-4-hydroxyphenyl)-cyclohexane,
1,4-bis-(3,5-dimethyl-4-hydroxyphenyl)-cyclohexane,
α,α'-bis-(3,5-dimethyl-4-hydroxyphenyl)-p-diisopropyl benzene, and
α,α'-bis-(3,5-dimethyl-4-hydroxyphenyl)-m-diisopropyl benzene.

Among the bisphenols on which the polycarbonate units of Formula III may be based, the following are especially preferred:
bis(3,5-dimethyl-4-hydroxyphenyl)-methane,
2,2-bis-(3,5-dimethyl-4-hydroxyphenyl)-propane,
2,4-bis-(3,5-dimethyl-4-hydroxyphenyl)-2-methyl butane,
1,1-bis-(3,5-dimethyl-4-hydroxyphenyl)-cyclohexane, and
α,α'-bis-(3,5-dimethyl-4-hydroxyphenyl)-p-diisopropyl benzene.

Bisphenols that are not 0,0,0',0'-tetraalkyl-substituted but still useful for preparing mixed polycarbonates or copolycarbonates utilizable in this invention include:
dihydroxy diphenyls,
bis-(hydroxyphenyl)-alkanes,
bis-(hydroxyphenyl)-cycloalkanes,
bis-(hydroxyphenyl)-sulphides,
bis-(hydroxyphenyl)-ethers,
bis-(hydroxyphenyl)-ketones,
bis-(hydroxyphenyl)-sulphoxides,
bis-(hydroxyphenyl)-sulphones, and
α,α'-bis-(hydroxyphenyl)-diisopropyl(hydroxyphenyl)-diisopropyl benzenes,
as well as compounds which are alkylated or halogenated in the nucleus. These and other suitable aromatic dihydroxy compounds have been described in U.S. Pat. Nos. 3,028,365; 2,999,835; 3,148,172; 3,271,368; 2,991,273; 3,271,365; 3,014,891; and 2,999,846, all of which are incorporated herein by reference.

Among these, the following are especially preferred:
2,2-bis-(4-hydroxyphenyl)-propane,
2,2-bis-(3,5-dichloro-4-hydroxyphenyl)-propane,
2,2-bis-(3,5-dibromo-4-hydroxyphenyl)-propane, and
α,α'-bis-(4-hydroxyphenyl)-p-diisopropyl benzene.

The polycarbonates may also optionally include small quantities of polyhydroxyl compounds as branching agents, for example, 0.05 to 2.0 mole %, based on the amount of bisphenols, as described in British Pat. Nos. 885,442 and 1,079,821, and in U.S. Pat. No. 3,544,514, which are incorporated herein by reference. Examples of such polyhydroxyl compounds which effect branching include:
phloroglucinol,
4,6-dimethyl-2,4,6-tri-(4-hydroxyphenyl)-heptene-(2),
1,3,5-tri-(4-hydroxyphenyl)-benzene,
1,1,1-tri-(4-hydroxyphenyl)-ethane,
tri-(4-hydroxyphenyl)-phenyl-methane,
2,2-bis-(4,4-(4,4'-dihydroxydiphenyl)-cyclohexyl)-propane,
2,4-bis-(4-hydroxyphenyl-4-isopropyl)-phenol,
2,6-bis-(2'-hydroxy-5'-methyl-benzyl)-4-methyl-phenol,
2,4-dihyroxybenzoic acid,
2-(4-hydroxyphenyl)-2-(2,4-dihydroxyphenyl)-propane, and
1,4-bis-(4',4''-dihydroxytriphenyl-methyl)-benzene.

The polycarbonates useful in this invention generally will have intrinsic viscosities as measured in solution in chloroform at 25° C. of from 0.30 to 0.70 deciliters per gram.

Further details regarding the aforementioned polycarbonates may be obtained from the disclosure of the above mentioned Serini et al. patent, which is incorporated herein by reference.

The alkenyl aromatic copolymer, component (b), comprises units derived from a compound having the formula

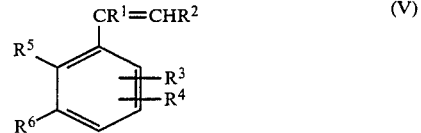

wherein $R^1$ and $R^2$ are selected from the group consisting of hydrogen, lower alkyl or alkenyl groups having from 1 to 6 carbon atoms; $R^3$ and $R^4$ are selected from the group consisting of hydrogen and lower alkyl having from 1 to 6 carbon atoms; $R^5$ and $R^6$ are selected from the group consisting of hydrogen, halogen, lower alkyl or alkenyl groups having from 1 to 6 carbon atoms, or $R^5$ and $R^6$ may be concatenated together with hydrocarbyl groups to form a naphthyl group; and units derived from a compound having the formula

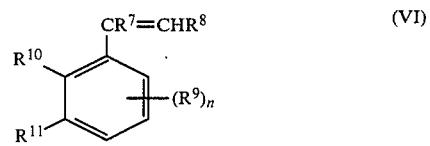

wherein $R^7$ and $R^8$ are selected from the group consisting of hydrogen, lower alkyl or alkenyl groups having from 1 to 6 carbon atoms, and hydrogen; $R^9$ is selected from the group consisting of chloro and bromo; $R^{10}$ and $R^{11}$ are selected from the group consisting of hydrogen, halogen, lower alkyl or alkenyl groups having from 1 to 6 carbon atoms, or $R^{10}$ and $R^{11}$ may be concatenated together to form a naphthyl group.

Examples of comonomers useful in the preparation of the above-described copolymer include styrene and its derivatives, homologs and analogs, such as α-methylstyrene, α-chlorostyrene, p-chlorostyrene, α-bromostyrene, p-bromostyrene, 2,4-dichlorostyrene, 2,4-dibromostyrene, p-methylstyrene, 3,4-dimethylstyrene, o- and p-divinylbenzene, p-methyl-α-methylstyrene and p-chloro-α-methylstyrene. Especially preferred are styrene and bromostyrene.

The alkenyl aromatic copolymer preferably comprises from about 10 to about 90, and more preferably from about 35 to about 70 percent by weight of halogenated units (Formula VI above).

The alkenyl aromatic copolymers, component (b), are known materials and can be prepared in the conventional manner by copolymerization from a mixture of the corresponding monomers. In one procedure, a mixture of styrene and bromostyrene is heated under an inert atmosphere in an enclosed container at a temperature from 80° to 140° C. for a period of 15 to 20 hours.

It may be beneficial to impact strength and other properties to employ a rubber modified alkenyl aromatic copolymer as component (b). Suitable rubber modifiers include natural rubber and synthetic rubbers such as polyisoprene, polybutadiene, polychloroprene, ethylene-propylene-diene terpolymer (EPDM rubber), styrene-butadiene copolymer (SBR rubber), styrene-acrylonitrile copolymer (SAN), ethylene-propylene copolymer (EPR), polyurethane, and polyorganosiloxane. The rubber content can vary widely but generally will range from about 5 to about 45 percent by weight.

Components (a) and (b) are utilizable in the compositions of this invention in widely variant amounts, preferably though not necessarily in a weight ratio of the two between 90:10 and 10:90.

The compositions can also include supplementary ingredients which are customarily employed in engineering thermoplastic blends as inert fillers or extenders or to affect the properties. These include mineral fillers, for example, clay, mica or talc; reinforcing fillers, or agents, for example, glass fibers, flakes or spheres or titanate whiskers; plasticizers; lubricants; mold release agents; antioxidants; stabilizers; colorants, for example, pigments and/or dyes; flame retardant agents (to further enhance the flame retardancy, if desired), impact improving modifiers (for example, styrene-butadiene block copolymers, and so forth. These may be added in conventional amounts.

The compositions can be prepared in any convenient manner. For instance, the ingredients may be tumble or solution blended to form an intimate admixture, which is then formed into a shaped article by extrusion and injection molding. Preferred extrusion temperatures will range from about 500° to about 600° F. and preferred molding temperatures from about 500° to about 550° F.

The compositions of this invention are useful for virtually any of the purposes for which moldable engineering thermoplastics have become known. Thus, they may be employed as structural components or parts in personal care products, household appliances, business machines, computers, automobiles, as well as other kinds of products in which plastics have replaced metal, wood, ceramics, etc. The compositions are also useful as coatings, suitably pigmented, on substrates such as metal, ceramics and other plastics. Because of the exceptional ultraviolet light resistance of the present blends, they are especially efficacious in commercial applications where the flame retardant molded product is exposed to sunlight or strong indoor light, either of which tends to cause fading and discoloration of the plastic.

The invention is further illustrated in the following examples, which should not be construed as limiting. All parts are by weight.

EXAMPLE 1

A mixture of 40 parts of the polycarbonate of 2,2-bis-(3,5-dimethyl-4-hydroxyphenyl)propane, intrinsic viscosity of 0.32 deciliters per gram in solution in chloroform at 25° C., 60 parts of a styrene-bromostyrene copolymer containing 70% by weight of bromostyrene, 3 parts of triphenyl phosphate, 5 parts of titanium dioxide and 10 parts of a hydrogenated block copolymer of styrene and butadiene (Shell Chemical's Kraton G 1652) was extruded through a 28 mm twin-screw extruder, and the extruded strands were chopped into molding pellets and molded at 520° F. into standard test pieces.

COMPARATIVE EXAMPLE A

The procedure of Example 1 was repeated, except that the styrene-bromostyrene copolymer was replaced with polystyrene homopolymer (Shell's 203 resin).

COMPARATIVE EXAMPLE B

The procedure of Comparative Example A was repeated, with the addition of 26.4 grams of decabromodiphenyl ether flame retardant. The bromine content, as a percentage of the total resin, is the same as in Example 1.

COMPARATIVE EXAMPLE C

A mixture of 40 parts of the polycarbonate, 38.4 grams of polystyrene homopolymer (Shell's 203), 3 parts of triphenyl phosphate, 5 parts of titanium dioxide, 10 parts of hydrogenated styrene-butadiene block copolymer, and 21.6 parts of decabromodiphenyl ether was extruded and molded in the same way as described in Example 1, to produce a composition containing the same amount of bromine as in Example 1 as a percentage of the total weight of the composition.

Molded test pieces from each of the foregoing examples were evaluated for physical properties. The results are reported in Table 1.

TABLE 1

| Blend | Tensile Elongation, % | Tensile yield, psi | Surface Gloss, 45° | Notched Izod Imp. Str., ft.lb./in. | Heat Distort. Temp., °F. |
|---|---|---|---|---|---|
| Example 1 | 10 | 9400 | 63.1 | 0.8 | 230 |
| Comp. Ex. A | 8 | 8200 | 62.3 | 0.5 | 222 |
| Comp. Ex. B | 8 | 6500 | 63.5 | 0.3 | 211 |
| Comp. Ex. C | 8 | 6700 | 63.5 | 0.3 | 209 |

The molded compositions were also evaluated for flame retardancy in the form of 1/16-inch thick test bars, in accordance with Underwriters' Laboratories' Bulletin No. 94 testing procedure. All of the test bars of Comparative Example A ignited during the first ten second application of the flame, then dripped and flamed; the average time for total extinction of the flame was 155 seconds. None of the test bars of Example 1, Comparative Example B or Comparative Example C ignited when the flame was applied for ten seconds.

The UV-stability of the blends was measured by exposing test samples at a distance of three inches to a revolving battery of fluorescent blacklight lamps, under a single thickness (0.090 inch) of ordinary window glass. The yellowness index was measured, and the time required for an increase of one unit in yellowness index (Y.I.) was estimated from a graph of the results. The UV stability of the blend of Example 1 was much better than that of each of the blends containing the low molecular weight brominated additive and significantly better than that of the blend with pure polystyrene, as can be seen from the results reported in Table 2.

TABLE 2

| Blend | Change in Y.I. after 23 days | Days to increase of 1 unit in Y.I. |
| --- | --- | --- |
| Example 1 | 1.3 | 22.8 |
| Comp. Ex. A | 2.4 | 16 |
| Comp. Ex. B | 88.7 | 0.4 |
| Comp. Ex. C | 79.6 | 0.4 |

Other variations and modifications of the invention are possible in the light of the above disclosure. It is to be understood, therefore, that changes may be made in the particular embodiments which are within the scope of the invention defined in the appended claims.

We claim:

1. A flame retardant thermoplastic composition, comprising:
   (a) an aromatic polycarbonate consisting essentially of a tetraalkyl-substituted aromatic polycarbonate; and
   (b) a copolymer consisting of units of a non-halogenated alkenyl aromatic compound having the formula

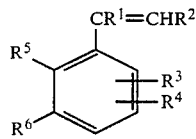

wherein $R^1$, $R^2$, $R^3$, $R^4$, $R^5$ and $R^6$ selected from the group consisting of hydrogen and lower alkyl groups having from 1 to 6 carbon atoms; and units of a brominated alkenyl aromatic compound having the formula

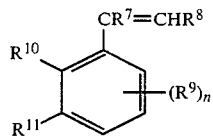

wherein $R^7$ and $R^8$ are selected from the group consisting of hydrogen and lower alkyl groups having from 1 to 6 carbon atoms, $R^9$ is bromine and, $R^{10}$, $R^{11}$ are selected from the group consisting of hydrogen, bromine and lower alkyl groups having from 1 to 6 carbon atoms, and n represents the number of $R^9$ substituents on the ring.

2. A composition according to claim 1, in which in component (a) at least 50 percent of the linear chains comprise units of the formula

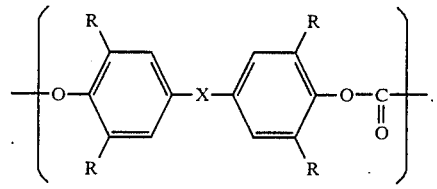

in which R represents $C_1$–$C_3$ alkyl and X represents a single bond, —O—, —CO—, —SO—, $C_1$–$C_{10}$ alkylene, $C_1$–$C_{10}$ alkylidene, $C_5$–$C_{15}$ cycloalkylene, $C_5$–$C_{15}$ cycloalkylidene, or

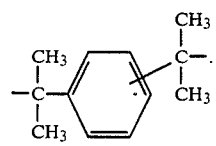

3. A composition according to claim 1, in which component (a) is an 0,0,0',0'-tetraalkyl-substituted bisphenol-A polycarbonate.

4. A composition according to claim 3, in which component (a) is an 0,0,0',0'-tetramethyl-substituted bisphenol-A polycarbonate.

5. A composition according to claim 1, in which component (b) is rubber modified.

6. A composition according to claim 1, in which component (b) comprises from about 10 to about 90 percent by weight of the brominated units.

7. A composition according to claim 1, in which component (b) comprises from about 35 to about 70 percent by weight of the brominated units.

8. A composition according to claim 1, in which component (b) is a copolymer of styrene and bromostyrene.

9. A composition according to claim 1, in which component (b) is a polybutadiene rubber modified copolymer of styrene and bromostyrene.

10. A composition according to claim 1, which includes one or more additives selected from the group consisting of flame retardant agents, mineral fillers, fibrous reinforcing agents, plasticizers, colorants and impact modifiers.

11. A flame retardant thermoplastic molding composition, comprising
   (a) from 10 to 90 parts by weight of an aromatic polycarbonate derived from 2,2-bis(3,5-dimethyl-4-hydroxyphenyl)propane; and
   (b) from 90 to 10 parts by weight of a copolymer of styrene and bromostyrene containing from about 35 to about 70 percent by weight of the bromostyrene.

* * * * *